United States Patent [19]

Kasama et al.

[11] 4,066,415
[45] Jan. 3, 1978

[54] GAS GENERATOR FOR INFLATABLE LIFE RAFT

[75] Inventors: Tsuneo Kasama; Makoto Wada; Masakatu Sano; Shinzo Tsuji, all of Kawagoe, Japan

[73] Assignee: Nippon Oil and Fats Co., Ltd., Tokyo, Japan

[21] Appl. No.: 654,347

[22] Filed: Feb. 2, 1976

[30] Foreign Application Priority Data

Feb. 3, 1975 Japan .................................. 50-14079
Feb. 28, 1975 Japan .................................. 50-27377[U]

[51] Int. Cl.² .......................... B01J 7/00; B63C 9/16; C09K 3/00; F23Q 1/02
[52] U.S. Cl. ...................................... 23/281; 9/11 A; 9/321; 102/39; 252/188; 280/741; 431/267; 431/275
[58] Field of Search .................. 23/281; 280/741; 149/35; 9/11 A, 321, 322, 324; 431/267, 273, 274, 275; 102/39

[56] References Cited
U.S. PATENT DOCUMENTS

| 3,066,014 | 11/1962 | White et al. ........................ 23/281 |
| 3,515,518 | 6/1970 | Halstead et al. .................... 23/281 |
| 3,692,495 | 9/1972 | Schneiter ............................ 23/281 |
| 3,723,205 | 3/1973 | Scheffee .......................... 280/741 X |
| 3,733,180 | 5/1973 | Heineck et al. .................... 23/281 |
| 3,737,287 | 6/1973 | Churchill et al. .................. 23/281 |
| 3,773,351 | 11/1973 | Catanzarite ..................... 23/281 X |
| 3,785,674 | 1/1974 | Poole et al. ..................... 23/281 X |
| 3,871,684 | 3/1975 | Standacher et al. .............. 23/281 X |
| 3,880,447 | 4/1975 | Thorn et al. ..................... 23/281 X |
| 3,950,263 | 4/1976 | Fukama et al. .................. 23/281 X |

Primary Examiner—Joseph Scovronek
Attorney, Agent, or Firm—Blanchard, Flynn, Thiel, Boutell & Tanis

[57] ABSTRACT

A gas generator for an inflatable life raft having a gas-generating chamber filled with a gas-generating composition which generates gas by chemical reaction, either a chemical cooling chamber or a physical cooling-and-filtering chamber or both, a gas passage in communication with a safety valve, and an ignition device which provides rotational friction between a friction means and a frictional igniting agent. The gas generator has the advantages that it is not influenced by the environmental temperature, a gas temperature drop due to adiabatic gas expansion accompanying the gas discharge does not occur and therefore the generated gas can very reliably be discharged, the gas is fully cleaned, troubles due to abnormality of the gas-generating composition can be avoided, and it can be made light and small.

17 Claims, 14 Drawing Figures

FIG. 6
FIG. 7
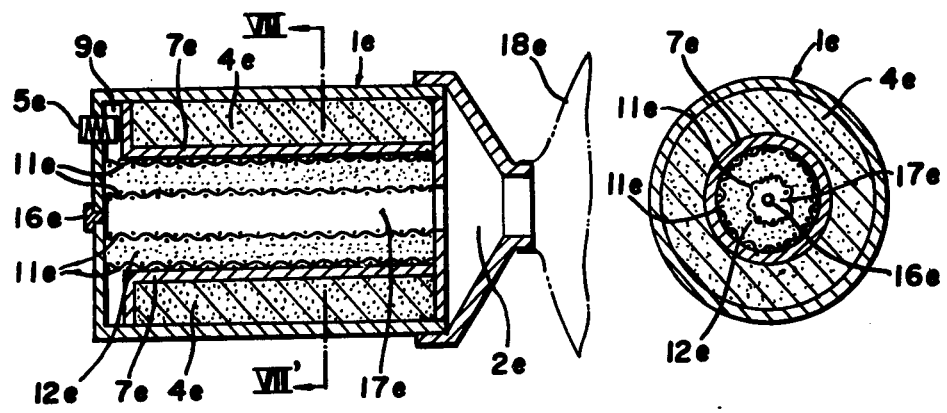
FIG. 8
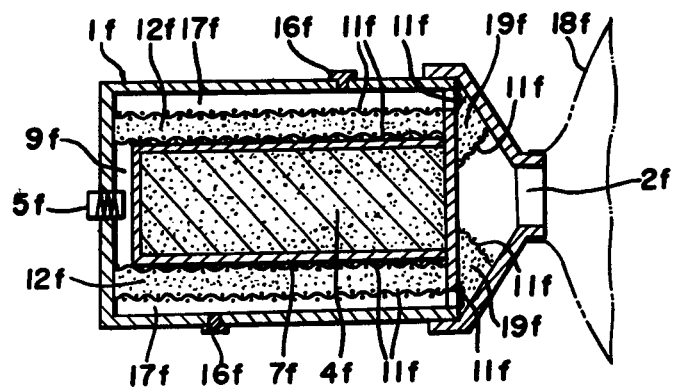

GAS GENERATOR FOR INFLATABLE LIFE RAFT

FIELD OF THE INVENTION

The present invention relates to a gas generator for use in an inflatable life raft.

DESCRIPTION OF THE PRIOR ART

A ship or a vessel is usually provided with inflatable life rafts. A conventional inflatable life raft has a gas inflation system which, when the life raft is to be inflated, opens a valve or a seal plate of a high pressure bomb provided therein and containing liquefied carbon dioxide to discharge carbon dioxide gas into the body of the life raft. However, the above-mentioned gas inflation system has the following disadvantages and therefore lacks reliability and is subjected to weight limitation:

First, the gas discharge rate varies with the environmental temperature at the time when the gas is discharged from the high pressure bomb, and therefore the time required for inflating the life raft also varies therewith. In addition, especially when the temperature is low, the high pressure bomb becomes lower in temperature as carbon dioxide gas is discharged therefrom due to adiabatic expansion of the gas with the result being that the gas discharge rate decreases and, in the worst case, part of the gas solidifies into dry ice thereby extremely lowering the gas discharge rate and causing clogging of the gas outlet. Such phenomena are not desirable, because the life raft must be inflated quickly in an emergency case such as shipwreck.

Second, carbon dioxide gas tends to gradually leak from the high pressure bomb while the bomb is stored on a ship for a long time, and therefore it is possible that the high pressure bomb will not hold a sufficient amount of carbon dioxide therein for inflating the life raft in an emergency.

Third, the high pressure bomb must be made pressure-tight for safety, because the temperature at which it is used or stored may reach as high as several tens of degrees centigrade due to exposure to the sun thereby increasing th inside pressure of the bomb to as high as 200 kg/cm$^2$. For this reason, the high pressure bomb is inevitably increased in weight, and accordingly the capacity of the inflatable life raft is decreased because it carries a heavier high pressure bomb.

SUMMARY OF THE INVENTION

It is an object of the present invention to provide a gas generator for an inflatable life raft which gas generator is not subject to decrease in its gas generating capacity during storage and also that caused by adiabatic gas expansion when in use.

It is another object of the present invention to provide a gas generator for an inflatable life raft which can be safely used without danger such as injury of users and explosion.

It is still another object of the present invention to provide a gas generator for an inflatable life raft, in which the carrying capacity of the life raft can be increased.

The present invention has been made on the basis of the following knowledge:

1. If a gas-generating composition which generates gas by combustion or thermal decomposition is used in a gas generator for an inflatable life raft, the gas-generating rate will not be influenced by the environmental temperature and adiabatic gas expansion.

2. If the gas generated when the above-mentioned gas-generating composition is burned is passed through at least a chemical cooling chamber filled with a chemical coolant and through at least a physical cooling-and-filtering chamber filled with a physical cooling-and-filtering medium, the gas will thermally decompose the chemical coolant by the thermal energy thereof and thereby the gas will be lowered in temperature and simultaneously will be filtered and cleaned when it passes through the chemical cooling chamber and, in addition, the gas will exchange heat with the physical cooling-and-filtering medium and simultaneously the by-products which are produced when the gas is generated and are entrained in the gas will be filtered and cooled, when the gas is passed through the physical cooling-and-filtering chamber.

3. If a safety valve is provided in the passage through which flows the gas cooled and cleaned by the process described in the above Item (2), the following effects will be obtained and thereby troubles due to abnormal generation of the gas from the gas-generating composition can be avoided:

a. Since the gas discharged through the safety valve has been cooled and cleaned, there will be no danger of the occurrence of secondary accidents.

b. Since clogging of the cooling-and-filtering layer does not occur, abnormal pressure in the gas-generating chamber is detected without delay as in the case where the safety valve is installed directly in the gas-generating chamber, and therefore the operating reliability of the safety valve is high.

c. Since the gas discharged through the safety valve contains no solid by-product residues, clogging of the safety valve outlet does not occur and therefore the safety valve can sufficiently fulfil its function.

4. If an ignition device which has a rotary mechanism for bringing a friction means into contact with a frictional igniting agent is adopted for use, the ignition device can be made small and light, and also the ignition reliability can be increased.

Gas-generating compositions that can be used for the present invention are various powders such as smokeless powder and composite-type propellant, decomposable or combustible compositions consisting mainly of azides of alkali metals or alkaline earth metals (for instance, consisting of azides alone, or additionally containing inorganic oxidizing agents or gasless exothermal agents), inorganic thermally decomposable substance such as carbonates and bicarbonates, organic thermally decomposable gas-generating substance such as azodicarbonamide and barium azodicarboxylate and azotetrazol, etc. Especially useful are the gas-generating compositions which generate nitrogen gas or carbon dioxide gas. For instance, the above-mentioned gas-generating compositions consisting mainly of azides of alkali metals or alkaline earth metals can advantageously generate a large amount of nitrogen gas. Preferred compositions of these gas-generating compositions are shown as follows by way of example:

1. Sodium azide — 60 parts by weight
   Manganese oxide(IV) — 40 parts by weight
2. Sodium azide — 60 parts by weight
   Manganese oxide(IV) — 40 parts by weight
   Zinc carbonate — 15 parts by weight
3. Sodium azide — 75 parts by weight
   Potassium perchlorate — 25 parts by weight 4. Barium azide — 75 parts by weight
Potassium perchlorate — 25 parts by weight
5. Ammonium perchlorate — 80 parts by weight
Unsaturated polyester resin — 20 parts by weight An endothermically decomposable substance is used as the chemical coolant in the present invention. When such substance is brought into contact with the generated hot gas, it is endothermically decomposed to chemically cool the generated gas. For instance, carbonates or bicarbonates of sodium, magnesium, calcium, zinc, etc., can be used. These compounds carry out a chemical cooling action by endothermic decomposition and simultaneously generate carbon dioxide gas, and therefore can advantageously increase the amount of gas generated from the entire gas generator.

Physical cooling-and-filtering mediums that can be used in the present invention are silica, alumina, silica-alumina, glass wool, metallic wool, wire gauze, etc.

Used as the friction means of the ignition device is a body coated with a friction agent (for instance, a composition consisting mainly of red phosphorus and additionally of glass powder, bonding agent, etc.) or a body which has a file-like rough surface.

Used as the frictional ignition agent is a conventional composition made by suitably combining potassium chlorate, potassium bichromate, manganese dioxide, iron oxide, sulphur, diatomaceous earth, glass powder, and zinc oxide.

Now the present invention will be hereinafter described in detail in conjunction with the accompanying drawings, in which:

FIGS. 4, 6 and 8 are longitudinal sectional views of gas generators for inflatable life rafts according to the other embodiments of the present invention, respectively;

FIG. 7 is a sectional view taken along Line VII—VII' of FIG. 6;

Figure 1:
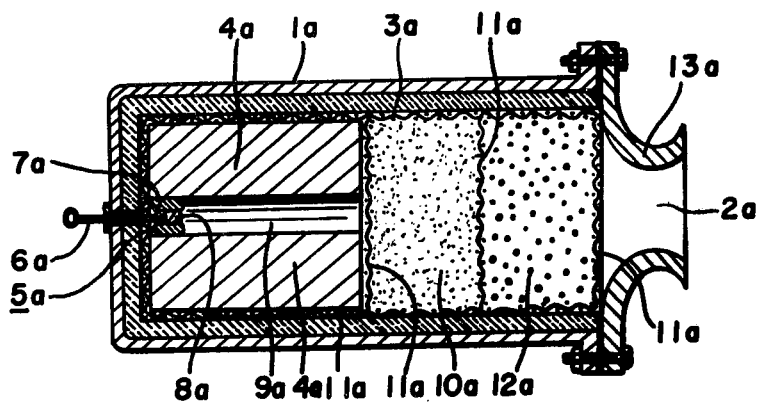
FIG. 1 is a longitudinal sectional view of a gas generator for an inflatable life raft according to one embodiment of the present invention.

Reference is now made to FIG. 1. Reference numeral 1a designates a casing of a gas generator, 2a designates a gas outlet, and 3a designates a heat insulating layer coated on the inside wall of the casing. This heat insulating layer 3a is made, for instance, of asbestos fiber, glass fiber, rock wool, or each of those holding a carbonate such as zinc carbonate thereon.

Numeral 4a designates a gas-generating chamber, which contains the above-mentioned gas-generating composition. The size of the gas-generating composition and the shape thereof, such as grain-, tablet- and particle-shape, are determined in consideration of the desired gas-generating rate (the rate of inflating the bag of an inflatable life raft).

Reference numeral 5a designates an ignition device composed of an ignition rod 6a and a frictional igniting agent layer 7a. The ignition rod 6a is coated at the leading end thereof with a friction agent 8a and is installed in a bore 9a provided in the gas-generating composition in the gas-generating chamber 4a so that it may carry out a reciprocating motion thereby rubbing the surface of the frictional igniting agent layer 7a.

Reference numeral 10a designates a chemical cooling chamber filled with a chemical coolant that can be thermally decomposed, such as zinc carbonate and the chemical coolant is held in a space defined by two wire gauze layers 11a.

Numeral 12a designates a physical cooling-and-filtering chamber filled, for instance, with aluminum oxide, silicon oxide, etc., having a particle size of 100 to 200 $\mu$ and which further cools the gas flow previously cooled in the chemical cooling chamber 10a and, in addition, filters by-products contained in the gas flow and produced when the gas is generated from the gas-generating composition. 13a designates a gas discharging nozzle.

In order to generate gas using this gas generator, the ignition rod 6a of the ignition device 5a is reciprocated horizontally. Such reciprocal motion brings the friction agent 8a applied on the leading end of the ignition rod 6a into contact with the frictional igniting agent layer 7a to ignite the frictional igniting agent 7a by frictional heat and thereby causes the gas-generating composition in the gas-generating chamber 4a to react to generate gas. When a composition consisting of 65% by weight of sodium azide and 35% by weight of manganese dioxide is used as gas-generating composition, the following reaction is performed to generate gas:

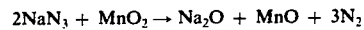

$$2NaN_3 + MnO_2 \rightarrow Na_2O + MnO + 3N_2$$

The gas thus produced is passed through the chemical cooling chamber 10a, the physical cooling-and-filtering chamber 12a and through the gas discharging nozzle 13a and is fed into the bag of the inflatable life raft thereby inflating the bag.

According to the present invention, gas is not discharged from a high pressure gas bomb, but rather is generated by combustion or decomposition reaction of the gas-generating composition. Therefore, the gas generator according to the present invention is not influenced by the environmental temperature and does not undergo adiabatic gas expansion due to gas discharge. Consequently, the gas discharge rate is not decreased when the generated gas is discharged. In addition, the discharged gas is passed through the chemical cooling chamber and the physical cooling-and-filtering chamber, and therefore the by-products produced in the gas-generating reaction are filtered and removed and the gas is cooled and is fed into the bag of the inflatable life raft very reliably without damaging the bag.

Figure 2:
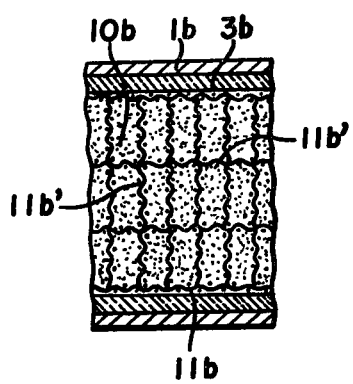
FIGS. 2 and 3 are fragmentary views showing the construction of cooling chambers of gas generators filled with chemical coolant according to two different embodiments of the present invention, respectively.
Figure 3:
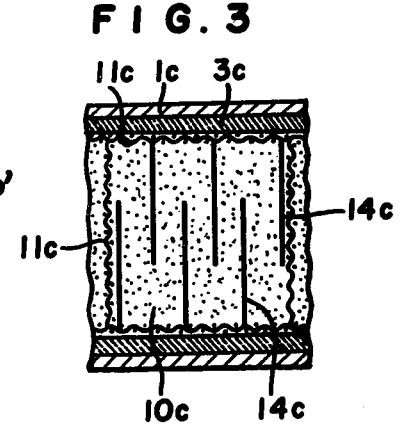

Reference is now made to FIGS. 2 and 3. In order to avoid a possible uneven gas flow caused by the chemical coolant being positioned unevenly in the chemical cooling chamber, wire gauzes 11b may be provided in the chemical cooling chamber 10b for uniformly holding the chemical coolant as shown in FIG. 2, or baffle board 14c may be provided in the chemical cooling chamber 10c formed of wire gauzes 11c as shown in FIG. 3.

Figure 4:
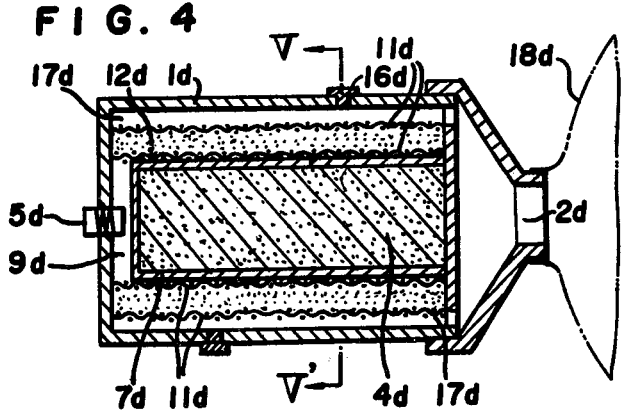
Figure 5:
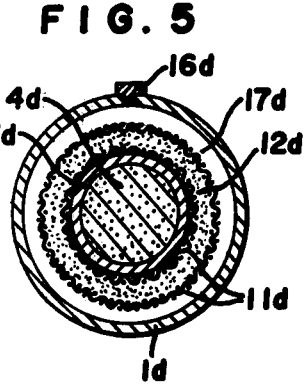
FIG. 5 is a sectional view taken along Line V—V' of FIG. 4.

Reference is now made to FIGS. 4 and 5. In cases where the gas generated has a low temperature owing to the kind of the gas-generating composition employed, it can be cleaned by filtering and removing the by-products produced when it is generated, by passing it through either the chemical cooling chamber or the physical cooling-and-filtering chamber.

If a safety valve is installed in communication with the gas passage that extends from the chemical cooling chamber and/or the physical cooling-and-filtering chamber to the gas outlet even when an abnormal combustion pressure occurs due to some abnormality of the gas-generating composition, the danger caused by abnormal high pressure can be avoided, since the generated gas is cooled and cleaned in the chemical cooling chamber and/or in the physical cooling-and-filtering chamber and is discharged through the safety valve.

In FIGS. 4 and 5, numeral 1d designates a casing of a gas generator, 2d designates a gas outlet, 4d designates a gas-generating chamber, 5d designates an ignition device, 7d designates an igniting agent, and 11d designates wire gauze layers.

When the calorific value of the generated gas is low because of the kind of the gas-generating composition employed, a heat insulating material need not be coated on the inside wall of the casing 1d unlike the embodiment shown in FIG. 1 and, in addition, the objects of the present invention can be achieved by provision of only either the physical cooling-and-filtering chamber or the chemical cooling chamber.

Numeral 12d designates a physical cooling-and-filtering chamber, 17d designates a gas passage, 16d designates a safety valve provided in communication with the gas passage 17d. The safety valve 16d may be of a seal-plate destruction type which is destroyed when the internal pressure exceeds the normal value, or it may be of an opening-and-closing tye which opens when the pressure exceeds the normal value and closes when pressure is lower than the normal value.

FIGS. 6 and 7 show an embodiment of the present invention, in which the gas-generating chamber filled with a gas-generating composition is disposed along the inside periphery of a gas generator casing. A gas-generating composition 4e is coated with an igniting agent 7e and is fixed to the inside wall of a casing 1e. Concentrically with the gas-generating chamber 4e, there are provided a physical cooling-and-filtering chamber 12e and a gas passage 17e defined by wire gauzes 11e. A safety valve 16e is installed on the casing 1e in communication with the gas passage 17e.

An ignition device 5e is operated electrically or mechanically in a usual manner to ignite the igniting agent 7e. As a result, the gas-generating composition in the gas-generating chamber 4e generates gas through combustion or decomposition reaction thereof. The gas thus generated is cooled and filtered to remove by-products entrained therein in the physical cooling-and-filtering chamber 12e, and then is fed into the bag 18e of an inflatable life raft through a gas outlet 2e.

An abnormal increase in the gas generation pressure caused by an abnormal gas-generating composition can be avoided by the safety valve 16e. In addition, the gas discharged through the safety valve is low in temperature and is clean, and therefore no danger of secondary accidents is incurred, a reliable operation of the safety valve is assured and the bag of the inflatable life raft is not damaged.

FIG. 8 shows another embodiment of the present invention, in which the gas discharged through the gas outlet is further cleaned. An ignition device 5f ignites an igniting agent 7f thereby burning or decomposing a gas-generating composition in a gas-generating chamber 4f to generate gas. The gas thus generated is passed through a physical cooling-and-filtering chamber 12f filled with a physical cooling-and-filtering medium and supported by wire gauzes 11f, wherein the gas is cooled and filtered to remove by-products entrained therein. Then, the gas is passed through a gas passage 17f and a physical cooling-and-filtering chamber 19f provided at the connection between the gas outlet 2f and the gas passage 17f. In this chamber 19f, the gas if further cooled and cleaned and then it is fed into the bag of an inflatable life raft. Numeral 16f designates a safety valve, and 1f designates the casing of the gas generator.

Figure 9:
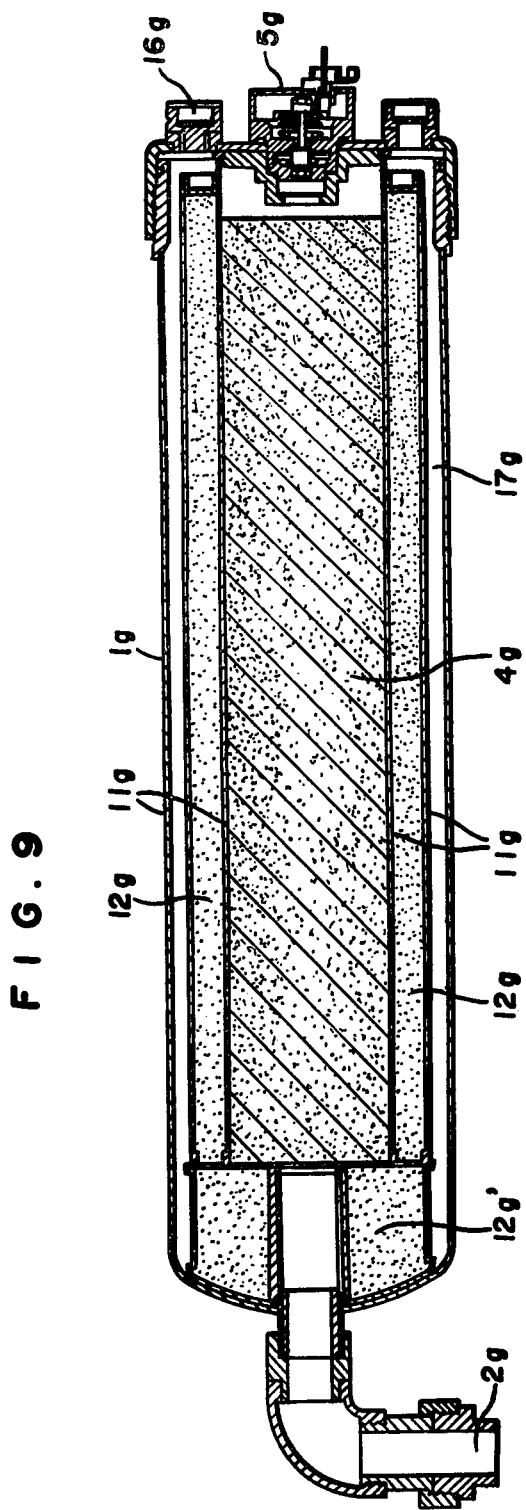
FIG. 9 is a longitudinal sectional view of a gas generator for an inflatable life raft according to still another embodiment of the present invention.
Figure 10:
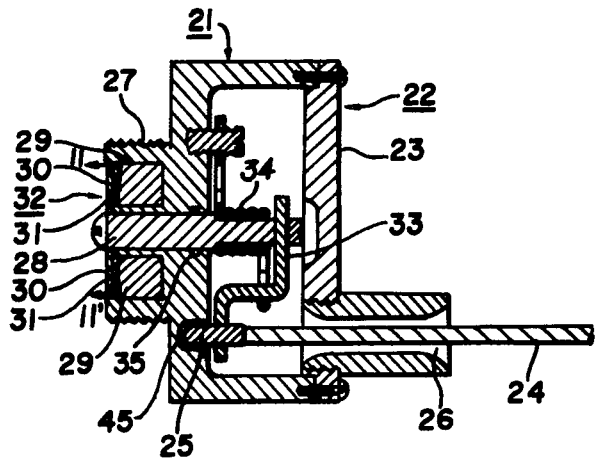
FIG. 10 is a longitudinal sectional view of an ignition device according to one embodiment of the present invention.
Figure 11:
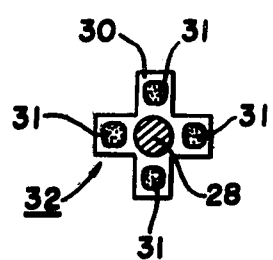
FIG. 11 is a sectional view taken along Line II—II' of FIG. 10.
Figure 12:
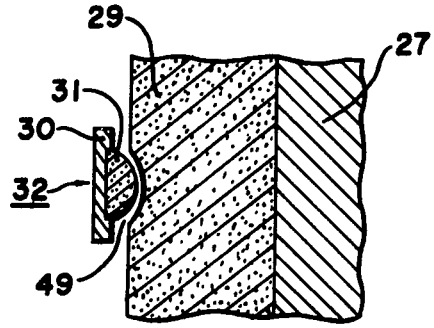
FIG. 12 is a view for explaining the positional relationship between the frictional ignition agent and the friction means before operation.
Figure 13:
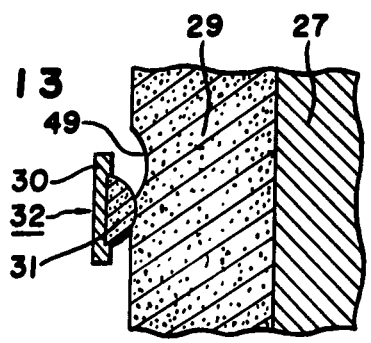
FIG. 13 is a view showing the frictional condition between the frictional ignition agent and the friction means.

FIGS. 9 and 10 show another embodiment of the present invention, which has a light and small-sized ignition device that can ignite a gas-generating composition effectively. Numeral 1g designates a casing of the gas generator, 2g designates a gas outlet, 4g designates a gas-generating chamber and 5g designates an ignition device.

As shown in FIG. 10, the ignition device 5f is composed of an ignition operating unit 21 and an operation control unit 22.

In the operation control unit 22, numeral 23 designates a casing, and numeral 24 designates a flexible operating rope having a pin 25 fixed to one end thereof. The pin is inserted in a pin hole 45 provided in the casing 23. Numeral 26 designates a guide hole for guiding the operating rope when it is pulled.

In the ignition operating unit 21, numeral 22 designates a holder for accommodating a frictional igniting agent 29, numeral 28 designates a rotary shaft having a rotary body 30 at one end thereof. The rotary body 30 holds a friction agent 31 so that the friction agent 31 may come into contact with the frictional igniting agent 29, thereby forming a friction means 32. The rotary body 30 may be cross-shaped as shown, linear, or Y-shaped; and it is so constructed that the friction agent 31 provided thereon may perfectly come into frictional contact with the frictional igniting agent 29 to efficiently and reliably transmit flames and heated particles to the gas-generating composition to be ignited. The friction agent 31 is positioned in a recessed portion 49 provided in the frictional igniting agent 29 so that the friction agent 31 may not come into contact with the frictional igniting agent 29 before operation.

Instead of the friction agent 31, the rotary body 30 may be provided with a rough file-like surface for forming the friction means 32.

In operating this ignition device, the operating rope 24 is pulled to the right in FIG. 10 to pull out the pin 25 from the pin hole 45. Thus, an arm 33 that has been fixedly held by the pin 25 is disengaged from the pin 25 and is rotated by the action of a torsion coil spring 34. As a result, the rotary shaft 28 is rotated and thereby the friction means 32 of the rotary body 30 provided on the rotary shaft 28 is pressed against the frictional igniting agent 29 by the action of the torsion coil spring 34.

While being pressed against the frictional igniting agent 29, the friction means 32 rapidly produce friction with the frictional igniting agent 29 to ignite the frictional igniting agent 29 thereby igniting the gas-generating composition positioned in the direction of flames emitted from the frictional igniting agent to generate gas.

An O-ring 35 is provided between the rotary shaft 28 and the holder 27 for maintaining air-tightness therebetween. The O-ring 35 prevents moisture absorption of the friction agent 31 and the frictional igniting agent 29 and also prevents gas leak at the time of ignition.

The gas generated from the gas-generating chamber 4g is passed through a porous, cylindrical physical cooling-and-filtering chamber 12g formed of wire gauzes 11g, thence through a gas passage 17g, and another physical cooling-and-filtering chamber 12g', and then is fed into the bag of an inflatable life raft through a gas outlet 2g.

A safety valve 16g is provided in communication with the gas passage 17g.

Figure 14:
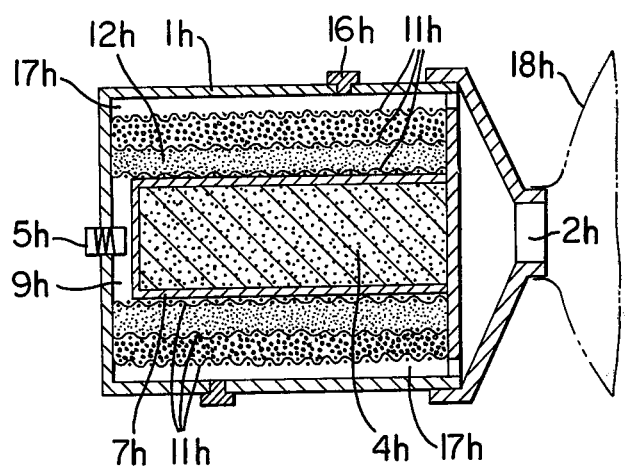
FIG. 14 is a longitudinal sectional view of another embodiment of the invention.

FIG. 14 is an embodiment like FIG. 4 showing the provision of both a chemical coolant and a physical cooling and filtering chamber. The parts of FIG. 14 are identified by the same reference numbers with the suffix "h" added thereto.

According to the present invention, the gas generator has an ignition device which is light, small in size, excellent in safety, high in ignition reliability, and easy to handle; and it is high in reliability, can discharge gas without being influenced by the environmental temperature, a decrease of the gas discharge rate or suspension of the gas discharge caused by adiabatic gas expansion accompanying the gas discharge does not occur, and requires only light auxiliary equipment and therefore can increase the carrying capacity of an inflatable life raft.

What is claimed is:

1. A gas generator for inflating inflatable objects, comprising: an elongated casing having a gas outlet at one longitudinal end thereof and adapted to be connected to an inflatable object, means in said casing defining an elongated central gas-generating chamber containing a gas-generating composition which generates gas by combustion or thermal decomposition and an igniter for igniting said gas-generating composition, means in said casing defining an elongated annular second chamber encircling said gas-generating chamber and connected in series gas flow relationship between said gas-generating chamber and said gas outlet, said second chamber being in radial gas flow communication with said gas-generating chamber and containing either a bed of an endothermically decomposable substance adapted to chemically cool the gas generated in said gas-generating chamber or a bed of a solid physically cooling and filtering substance for physically cooling and filtering said gas or serially arranged beds of both of said substances, said casing having means defining an elongated annular gas flow passage surrounding said second chamber and connected in series gas flow relationship between said second chamber and said gas outlet, and pressure relief valve means mounted on said casing and connected in said gas flow passage and adapted to be opened to place the gas flow passage in communication with the ambient atmosphere when the pressure of the cooled gas flowing through said gas flow passage into said gas outlet exceeds a predetermined value, said gas outlet being a converging nozzle mounted on said casing adjacent one axial end of said gas flow passage.

2. A gas generator as claimed in claim 1 wherein the second chamber contains physical cooling and filtering substance selected from the group consisting of silica, alumina, silica-alumina, glass wool, metallic wool and wire gauze.

3. A gas generator as claimed in claim 1 wherein the second chamber contains endothermically decomposable substance selected from the group consisting of zinc carbonate, calcium carbonate, magnesium carbonate, sodium carbonate, calcium bicarbonate and sodium bicarbonate.

4. A gas generator as claimed in claim 1 in which said gas-generating composition consists essentially of a mixture of sodium azide and manganese oxide (IV).

5. A gas generator as claimed in claim 1 wherein said substance in said second chamber is confined between and is supported by wire gauze layers.

6. A gas generator as claimed in claim 1 wherein said second chamber contains a bed of said endothermically decomposable substance and a bed of said physical cooling and filtering substance arranged in series between said gas-generating chamber and said gas flow passage.

7. A gas generator as claimed in claim 6 in which said endothermically decomposable substance is selected from the group consisting of zinc carbonate, calcium carbonate, magnesium carbonate, sodium carbonate, calcium bicarbonate and sodium bicarbonate and said physical cooling and filtering substance is selected from the group consisting of silica, alumina, silica-alumina, glass wool, metallic wool and wire gauze.

8. A gas generator as claimed in claim 1 wherein said gas-generating composition consists essentially of 60 parts by weight of sodium azide and 40 parts by weight of manganese oxide (IV).

9. A gas generator for inflating inflatable objects, comprising: a casing having a gas outlet adapted to be connected to an inflatable object, means in said casing defining a gas-generating chamber containing a gas-generating composition which generates gas by combustion or thermal decomposition and an igniter for igniting said gas-generating composition, said igniter comprising a rotary body mounted on a rotatable shaft and having friction means on its surface, means for rotating said shaft, a frictional ignition agent associated with said gas-generating composition and being positioned to contact said friction means and having a recessed portion for accommodating said friction means so that said friction means does not contact said frictional ignition agent until said friction means is rotated, means in said casing defining a second chamber connected in series between said gas-generating chamber and said gas outlet, said second chamber being in gas flow communication with said gas-generating chamber and containing either a bed of an endothermically decomposable substance adapted to chemically cool the gas generated in said gas-generating chamber or a bed of a solid physical cooling and filtering substance for physically cooling and filtering said gas or serially arranged beds of both of said substances, said casing having means defining a gas flow passage connected in series between said second chamber and said gas outlet.

10. A gas generator for inflating inflatable objects, comprising: an elongated casing having a gas outlet at one longitudinal end thereof and adapted to be connected to an inflatable object, means in said casing defining an outer elongated annular gas-generating chamber containing a gas-generating composition which generates gas by combustion or thermal decomposition and an igniter for igniting said gas-generating composition, means in said casing defining an inner elongated annular second chamber disposed within and encircled by said gas-generating chamber and connected in series gas flow relationship between said gas-generating chamber and said gas outlet, said second chamber being in radial gas flow communication with said gas-generating chamber and containing either a bed of an endothermically decomposable substance adapted to chemically cool the gas generated in said gas-generating chamber or a bed of a solid physical cooling and filtering substance for physically cooling and filtering said gas or serially arranged beds of both of said substances, the central opening of said second chamber defining an elongated gas flow passage connected in series between said second chamber and said gas outlet, and pressure relief valve means mounted on said casing at the opposite end thereof from said gas outlet and connected in said gas flow passage and adapted to be opened to place the gas flow passage in communication with the ambient atmosphere when the pressure of the cooled gas flowing through said gas flow passage into said gas outlet exceeds a predetermined value.

11. A gas generator as claimed in claim 10 wherein the second chamber contains physical cooling and filtering substance selected from the group consisting of silica, alumina, silica-alumina, glass wool, metallic wool and wire gauze.

12. A gas generator as claimed in claim 10 wherein the second chamber contains endothermically decomposable substance selected from the group consisting of zinc carbonate, calcium carbonate, magnesium carbonate, sodium carbonate, calcium bicarbonate and sodium bicarbonate.

13. A gas generator as claimed in claim 10 in which said gas-generating composition consists essentially of a mixture of sodium azide and manganese oxide (IV).

14. A gas generator as claimed in claim 10 wherein said substance in said second chamber is confined between and is supported by wire gauze layers.

15. A gas generator as claimed in claim 10 wherein said second chamber contains a bed of said endothermically decomposable substance and a bed of said physical cooling and filtering substance arranged in series between said gas-generating chamber and said gas flow passage.

16. A gas generator as claimed in claim 15 in which said endothermically decomposable substance is selected from the group consisting of zinc carbonate, calcium carbonate, magnesium carbonate, sodium carbonate, calcium bicarbonate and sodium bicarbonate and said physical cooling and filtering substance is selected from the group consisting of silica, alumina, silica-alumina, glass wool, metallic wool and wire gauze.

17. A gas generator as claimed in claim 10 wherein said gas-generating composition consists essentially of 60 parts by weight of sodium azide and 40 parts by weight of manganese oxide (IV).

* * * * *